Feb. 26, 1935. W. A. CHRYST 1,992,519
JACKING DEVICE
Filed Jan. 28, 1933  3 Sheets-Sheet 1
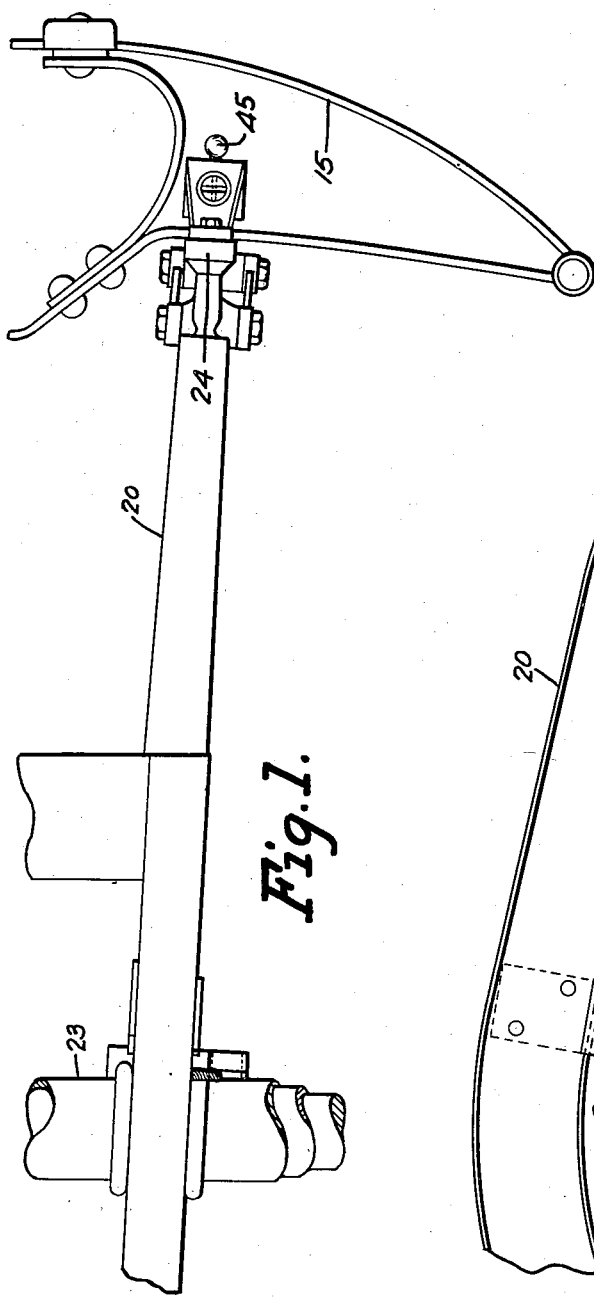
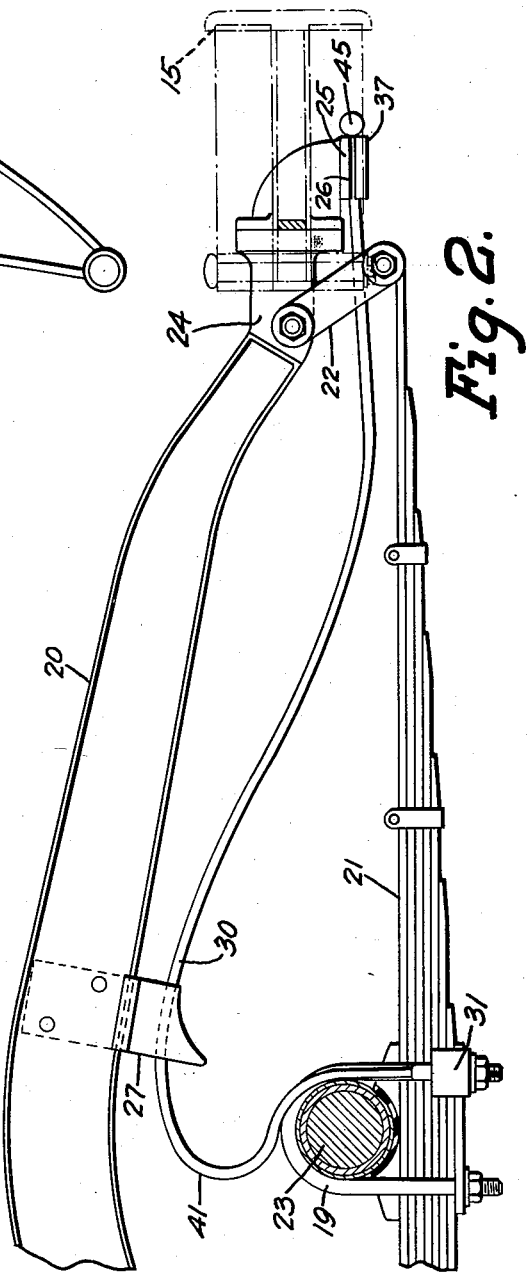
INVENTOR
WILLIAM A. CHRYST
BY
ATTORNEYS Feb. 26, 1935.    W. A. CHRYST    1,992,519
JACKING DEVICE
Filed Jan. 28, 1933    3 Sheets-Sheet 2
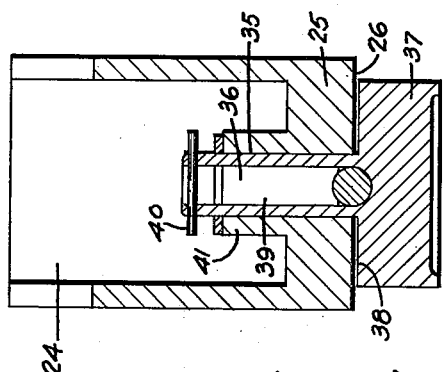
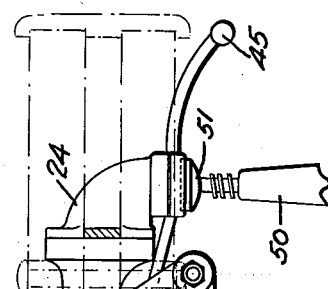
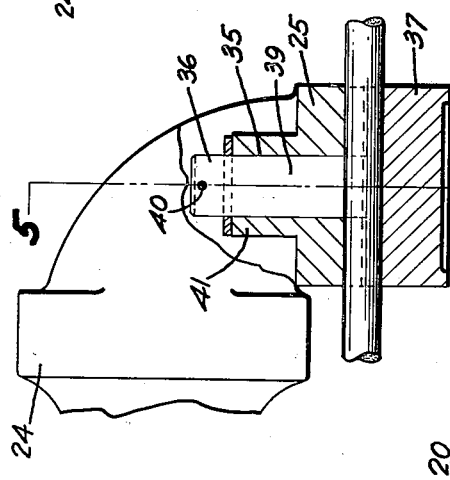
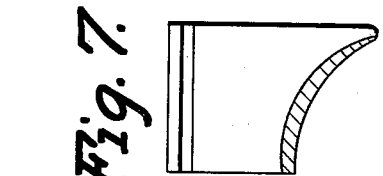
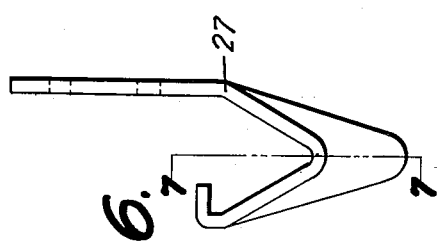
INVENTOR
WILLIAM A. CHRYST
BY
*Spencer, Hardman and Fehl*
ATTORNEYS Feb. 26, 1935. W. A. CHRYST 1,992,519
JACKING DEVICE
Filed Jan. 28, 1933 3 Sheets-Sheet 3
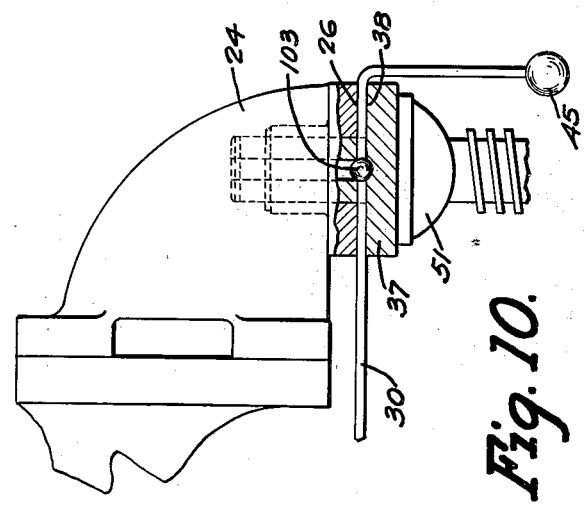
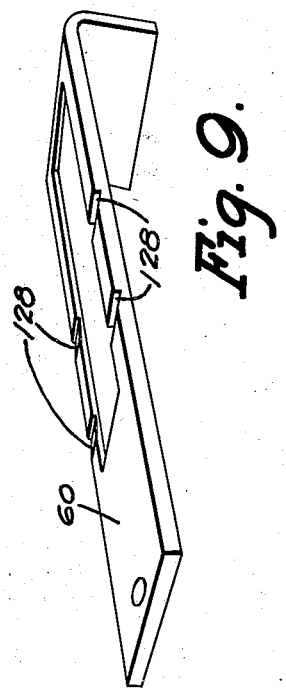
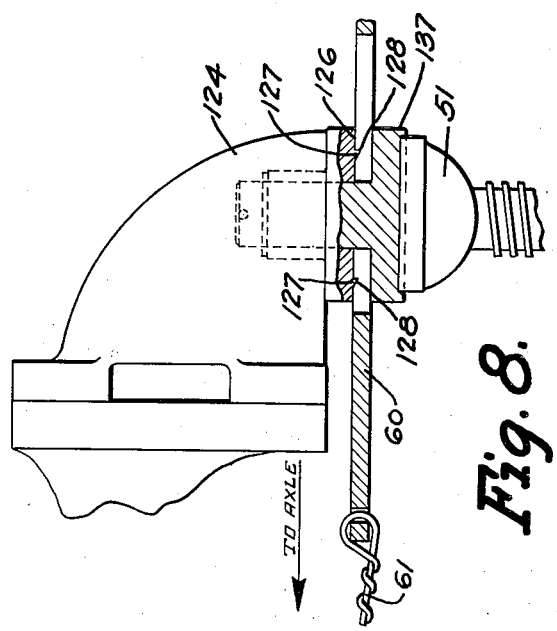
INVENTOR
WILLIAM A. CHRYST
BY
Spencer, Hardman and John
ATTORNEYS Patented Feb. 26, 1935

1,992,519

UNITED STATES PATENT OFFICE 1,992,519

JACKING DEVICE

William A. Chryst, Dayton, Ohio, assignor, by mesne assignments, to General Motors Corporation, Detroit, Mich., a corporation of Delaware Application January 28, 1933, Serial No. 653,984

10 Claims. (Cl. 280—150)

This invention relates to a device adapted to facilitate jacking up of automobiles.

The trend of design in automobiles leads to underslung chassis, tires having a larger cross-sectional area and bodies extending a greater distance beyond the axles, especially the rear axles, all of which contribute to the difficulty of placing a jack under the axle to lift it for purposes such as changing a wheel or a tire. If the jack is sufficiently short, normally, so that it is possible to place it under the axle when a large diameter, balloon tire is completely deflated, then the body extending a great distance beyond the rear axle prohibits the placing of the jack beneath the axle unless the attendant assumes a substantially prone position on the dirty highway.

It is among the objects of the present invention to provide an automobile with means for tying the axle to the frame so that the lifting effect may be applied to any easily accessible portion of the frame which will result in a simultaneous lifting of the axle and the desired wheel.

Further objects and advantages of the present invention will be apparent from the following description, reference being had to the accompanying drawings wherein a preferred embodiment of one form of the present invention is clearly shown.

In the drawings:

Fig. 1 is a fragmentary plan view of a vehicle chassis, showing a portion of one side member of the frame and a part of the axle.

Fig. 2 is a fragmentary side view of the vehicle chassis, showing the frame and axle, the wheels being omitted for the sake of clearness.

Fig. 3 is a view similar to Fig. 2, the link connection of the invention being shown in taut position.

Fig. 4 is an enlarged detail view, partly in section, showing the clamping device of the invention.

Fig. 5 is a sectional view taken substantially along the line 5—5 of Fig. 4.

Fig. 6 is a detail view of the supporting member of the device.

Fig. 7 is another view of the device shown in Fig. 6.

Fig. 8 is a fragmentary view showing a modified form of the invention.

Fig. 9 is a detail perspective view illustrating the rigid portion of the link connection of the modified form.

Fig. 10 is a view showing another form of modification of the present invention.

Referring to the drawings and particularly Figs. 1 and 2, the numeral 20 designates one side member of the frame to which one end of the spring 21 is hingedly secured by the shackle 22. The axle 23 of the vehicle is anchored to the spring 21 by any suitable U-bolts 19, this axle having the road wheels of the vehicle attached thereto, said road wheels not being shown for the sake of clearness.

At the extreme end of the frame 20 there is secured a bracket 24, which serves not only as a lifting anchorage for the jack as will be explained later but also as an attachment member for the bumper 15. This bracket has a face plate 25, one surface thereof being substantially parallel with the roadway upon which the road wheels of the vehicle are resting. This face is designated by the numeral 26.

A supporting member 27, shown in the present invention in the form of a hook or open-eyed member, is attached to the frame 20 substantially above the axle 23. A link 30, at least a portion of which is flexible, has one end (the flexible end), attached to the axle 23 or to the member 31 which attaches the axle to the spring 21, the flexible part of this link passing through the hook or open-eyed supporting member 27 and through the shackle 22. Link 30 may be a cable the diameter of which is sufficiently large that when the axle and wheels of the vehicle are suspended thereby there will be no appreciable stretching thereof.

As will be seen in Figs. 4 and 5, bracket 24 has a channel or hole 35, the axis of which is substantially at right angles to the face 26 of said bracket. This hole receives a cylindrical extension 36 of the clamping member 37, said clamping member having a face 38 substantially parallel to face 26 when its extension 36 is in position within the hole 35 in the bracket 24. As shown in Fig. 5, the cylindrical extension 36 has a slot 39, the bottom or closed end of which normally lies beneath the face 26 of the bracket 24. A pin 40 in the cylindrical extension 36 permits endwise movement of the cylindrical extension 36 within the hole 35 in bracket 24, but prevents removal thereof. Normally the cylindrical member 37 is in a position relative to the bracket 24 so that pin 40, in its cylindrical extension 36, rests against the upper edge of the central lug 41 of bracket 24 in which the hole or passage 35 is provided. The flexible cable 30 as shown in Figs. 2, 4 and 5, passes between the clamping member 37 and the face 26 of the bracket 24, this flexible member also passing through the slot 39 of the cylindrical extension 36, as particularly shown in Fig. 5. Normally the flexible member 30 has a considerable slack portion as shown at 41 to permit free action of the axle 23 relative to the frame 20 during operation of the vehicle. When in this normal position a ball handle 45 at the end of the cable extending beyond the bracket 24 is held against the outer edge of the bracket 24 and clamp 37 as shown in Figs. 1 and 2.

If it becomes necessary for the axle to be raised for purposes of changing a wheel or tire or otherwise, then the operator places the lifting means or jack designated by the numeral 50 so that its head 51 is directly beneath the clamp 37. He then grasps the ball handle 45 of the link and pulls it so as to take up the slack 41 in the cable or link 30, bringing it into a position as shown in Fig. 3. Now the jack 50 is operated to exert a lifting force against the clamping member 37 which urges said clamping member toward the face 26 of the bracket 24 and consequently rigidly clamps the link or cable 30 between the faces 38 and 26 of the clamping member 37 and bracket 24 respectively. Now the taut flexible connection or link 30 securely ties the axle 23 to the frame 20 and any lifting effort applied to the frame 20 will likewise lift the axle 23 with it.

It will be seen that this greatly facilitates jacking of the car, particularly a low, under-slung car with a body portion extending rearwardly far beyond its rear axle 23 due to the fact that the jacking or lifting effort is applied at the rear-most extremity of the frame 20 which is easily accessible even in under-slung cars having bodies extending considerably rearwardly.

In the Figs. 8 and 9, a modified form includes a rigid link portion 60 to which one end of the flexible link portion 61 is secured, the other end of said flexible link portion being anchored to the axle securing member 31 in a manner similarly as shown in Fig. 2. This flexible link portion 61 also extends through the hook or open-eyed supporting member 27, as shown in this figure.

In this modified form the face 126 of the bracket 124 has lugs 127 extending therefrom which are adapted to be received by recesses 128 in the link member 60 when said link member is pulled out to render the flexible link portion 61 taut. The jack head 51 engaging the clamping member 137 and exerting a lifting force against it, will maintain the link portion 60 in locking engagement with the lugs or extensions 127 in the bracket 124 and thus the axle will be securely tied to the frame 20 for jacking purposes.

In Fig. 10 an entirely flexible link 30 is provided, this link having a ball end 45 similar to that aforedescribed, however, in this instance, a ball member 103 is secured to the flexible link or cable 30 in any suitable manner such as by welding or the like, this ball member 103 being adapted to fit into a recess formed by cooperating indents in the surfaces 26 and 38 of the bracket and clamping member 24 and 37 respectively so that this flexible link 30 is actually locked in position when the jack head 51 exerts a lifting force against the clamping member 37.

From the aforegoing it may be seen that applicant has provided a very simple yet efficient device for facilitating the raising of low, under-slung cars having bodies extending rearwardly a considerable distance beyond the axle, said device being so constructed and arranged that it may be produced commercially at a minimum expense of time and material and may very easily be assembled upon the car. This device requires very few extra parts. For instance, the supporting member 27 and the clamping member 37 together with the link 30 are practically the only extra parts that are necessary, for the bracket 24 may be a reoperated bumper bracket which already has been provided on the vehicle.

While the form of embodiment of the present invention as herein disclosed, constitutes a preferred form, it is to be understood that other forms might be adopted, all coming within the scope of the claims which follow.

What is claimed is as follows:

1. In a jacking device for a vehicle, the combination with the frame, axles and wheels of the vehicle, and a lifting means; of a normally slack link having one end directly attached to the axle, but adapted to be pulled taut said link being substantially unstretchable by the weight of the axle and wheels; and means engageable by the lifting means for securing the link to the frame whereby a substantially non-stretchable tie is provided between the axle and frame causing the axle and wheel to be lifted with the frame.

2. In a jacking device for a vehicle, the combination with the frame, axles and wheels of the vehicle, and a lifting means; of a normally slack substantially non-stretchable link directly attached to the axle, but adapted to be pulled taut; and clamping means carried by the frame and engaging the link, said means being engageable by the lifting means to clamp the link to the frame and thus non-yieldingly tie the axle to said frame while it is being lifted.

3. In a jacking device for a vehicle, the combination with the frame, axles and wheels of the vehicle, and a lifting means; of a normally slack cable substantially incapable of being extended in length, by the weight of the axle and wheels having one end directly attached to an axle of the vehicle and being slidably secured to the frame at a plurality of stations, said cable being adapted to be pulled taut to tie the axle to the frame; and means movably carried by the frame so as to be engageable by the lifting means to be actuated thereby for securing said cable to the frame at one of said stations.

4. In a jacking device for a vehicle, the combination with the frame, axles and wheels of the vehicle, and a lifting means; of a normally slack cable having one end attached to an axle of the vehicle and slidably secured to the frame at a plurality of stations said cable being adapted to be pulled taut; and clamping means forming one of the stations at which the cable is slidably attached to the frame, said means being engageable by the lifting means to clamp the cable to the frame and lift the axle with said frame.

5. In a jacking device for vehicles, the combination with the frame, axles and wheels of the vehicle, and a lifting means; of a supporting member on the frame; a flexible connecting link movable into taut or slack positions and having one end attached to the axle and passing over the supporting member; and a clamp movably attached to the frame, the flexible link passing between said clamp and frame, said clamp being engageable by the lifting means to clamp the connecting link to the frame and raise the axle and wheels with said frame when said link has been moved into taut position.

6. In a jacking device for vehicles, the combination with the frame, axles and wheels of the vehicle, and a lifting means; of an eyed member secured to the frame substantially above the axle; a flexible, substantially non-stretchable connecting link normally slack but adapted to be drawn taut, one end of said link being attached directly to the axle and passing through the eyed member; a clamp movably carried adjacent the end of the frame and supporting the connecting link between it and the frame, said clamp being engageable by the lifting means to clamp the connecting link to the frame while the frame is being lifted whereby the vehicle axle and wheel will be lifted with the frame when said link has been moved into taut position.

7. In a jacking device for vehicles, the combination with the frame, axles and wheels of the vehicle, and a lifting means; of an eyed member secured to the frame substantially above the axle; a normally slack connecting link adapted to be drawn taut, one end of said link being attached to the axle, another portion passing through the eyed member, said flexible link having sufficient slack between the axle and eyed member to permit free movement of the axle relatively to the frame; a clamp movably attached to the frame at its extreme end, and having the flexible link resting upon it, said flexible link, after having the slack therein taken up, being tightly pressed against the frame by engagement of the lifting means with the clamp, whereby the wheel and axle of the vehicle is lifted with said frame.

8. In a jacking device for vehicles, the combination with the frame, axles and wheels of the vehicle, and a lifting means; of an eyed member secured to the frame substantially above the axle; a clamp provided adjacent the end of the frame, said clamp being engageable by the lifting means for raising the frame; a supporting member on the frame above the axle; and a flexible, substantially non-stretchable link attached at one end to the axle, passing over the supporting member and through the clamp and adapted to be gripped thereby rigidly to tie the axle to the frame during the lifting of the latter.

9. In a jacking device for vehicles, the combination with the frame, axles and wheels of the vehicle and a lifting means; of a supporting member carried by the frame above the axle; a clamp on the frame adjacent its end, said clamp being engageable by the lifting means to shut the clamp and lift the frame; and a cable attached at one end to the axle, passing over the supporting member and through the clamp, said cable normally having sufficient slack to permit free movement of the axle but capable of being drawn taut so that when gripped by the shutting clamp the wheel and axle to which it is attached will be lifted with the frame.

10. In a jacking device for a vehicle, the combination with the frame, axles and wheels of the vehicle and a lifting means; of a normally slack cable substantially incapable of being extended in length by the weight of the axle and wheels, having one end directly attached to an axle of the vehicle and being slidably secured to the frame at a plurality of stations, said cable being adapted to be pulled taut to tie the axle to the frame; and means movably carried by the frame so as to be engageable by the lifting means to be actuated thereby for holding said cable to the frame at one of said stations.

WILLIAM A. CHRYST.